(12) United States Patent
Komada (10) Patent No.: US 10,266,227 B2
(45) Date of Patent: Apr. 23, 2019

(54) BICYCLE OPERATING DEVICE

(71) Applicant: SHIMANO INC., Sakai (JP)

(72) Inventor: Yasuyuki Komada, Sakai (JP)

(73) Assignee: SHIMANO INC., Sakai (JP)

(*) Notice: Subject to any disclaimer, the term of this patent is extended or adjusted under 35 U.S.C. 154(b) by 209 days.

(21) Appl. No.: 15/199,810

(22) Filed: Jun. 30, 2016

(65) Prior Publication Data

US 2018/0001956 A1    Jan. 4, 2018

(51) Int. Cl.
*B62L 3/02* (2006.01)

(52) U.S. Cl.
CPC .................... *B62L 3/023* (2013.01)

(58) Field of Classification Search
CPC .................... B62L 3/023; B62K 23/06
See application file for complete search history.

(56) References Cited

U.S. PATENT DOCUMENTS

| 2005/0056508 | A1* | 3/2005 | Laghi | B60T 11/22 |
| | | | | 188/344 |
| 2011/0240426 | A1* | 10/2011 | Hirose | B60T 7/102 |
| | | | | 188/344 |
| 2012/0240715 | A1 | 9/2012 | Tsai | |
| 2014/0174237 | A1 | 6/2014 | Watarai et al. | |
| 2016/0264213 | A1* | 9/2016 | Swanson | B62L 3/023 |

* cited by examiner

*Primary Examiner* — Vishal R Sahni
(74) *Attorney, Agent, or Firm* — Mori & Ward, LLP (57) ABSTRACT

An operating member is movably coupled to a base member. A hydraulic unit comprises a cylinder bore and a piston movably provided in the cylinder bore. The piston is coupled to the operating member to generate a hydraulic pressure in response to a movement of the operating member relative to the base member. A reservoir tank comprises a lid opening having a maximum width and a reservoir bore extending from the lid opening and having a maximum depth. The maximum depth is larger than the maximum width. The reservoir bore is connected to the cylinder bore and disposed above the cylinder bore in a mounting state where the bicycle operating device is mounted to the bicycle body. At least one of the cylinder bore and the reservoir tank is integrally provided with the base member.

24 Claims, 5 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a base member, an operating member, a hydraulic unit, and a reservoir tank. The base member comprises a proximal end portion and a distal end portion. The proximal end portion is configured to be coupled to a bicycle body in a mounting state where the bicycle operating device is mounted to the bicycle body. The distal end portion is arranged further from the bicycle body than the proximal end portion in the mounting state. The base member has a graspable shape between the proximal end portion and the distal end portion. The operating member is movably coupled to the base member. The hydraulic unit comprises a cylinder bore and a piston. The piston is movably provided in the cylinder bore. The piston is coupled to the operating member to generate a hydraulic pressure in response to a movement of the operating member relative to the base member. The reservoir tank comprises a lid opening and a reservoir bore. The lid opening has a maximum width. The reservoir bore extends from the lid opening and has a maximum depth. The maximum depth is larger than the maximum width. The reservoir bore is connected to the cylinder bore and disposed above the cylinder bore in the mounting state. At least one of the cylinder bore and the reservoir tank is integrally provided with the base member.

With the bicycle operating device according to the first aspect, the reservoir bore extends from the lid opening and has a maximum depth larger than the maximum width of the lid opening. At least one of the cylinder bore and the reservoir tank is integrally provided with the base member as a one-piece unitary member. Accordingly, it is possible to accomplish an ideal arrangement of the hydraulic unit with simple manufacturing processes of the base member. Therefore, it enhances a yield rate and decreases a manufacturing cost for manufacturing the bicycle operating device.

In accordance with a second aspect of the present invention, a bicycle operating device comprises a base member, an operating member, a hydraulic unit, and a reservoir tank. The base member comprises a proximal end portion. The operating member is movably coupled to the base member. The hydraulic unit comprises a cylinder bore and a piston. The cylinder bore comprises a cylinder center axis, a first cylinder end, and a second cylinder end. The second cylinder end is opposite to the first cylinder end along the cylinder center axis. The first cylinder end is farther from the proximal end portion than the second cylinder end. The piston is movably provided in the cylinder bore. The piston is coupled to the operating member to generate a hydraulic pressure in response to a movement of the operating member relative to the base member. The reservoir tank comprises a lid opening and a reservoir bore. The lid opening has a maximum width. The reservoir bore extends from the lid opening and has a maximum depth. The maximum depth is larger than the maximum width. The reservoir bore is connected to the cylinder bore and disposed above the cylinder bore in a mounting state where the bicycle operating device is mounted to a bicycle body. The reservoir bore comprises a reservoir bottom opposite to the lid opening. The lid opening is farther from the proximal end portion of the base member than the reservoir bottom and offset from the first cylinder end.

With the bicycle operating device according to the second aspect, the lid opening is offset from the first cylinder end. Accordingly, it enhances design flexibility of the bicycle operating device compared to a bicycle operating device in which the lid opening and the first cylinder end are disposed in parallel, and it can effectively utilize an inner space of the base member.

In accordance with a third aspect of the present invention, the bicycle operating device according to at least one of the above aspects is configured so that the lid opening is defined on a predetermined plane. The reservoir bore extends in a longitudinal direction perpendicular to the predetermined plane.

With the bicycle operating device according to the third aspect, it is easy to form the reservoir bore by molding.

In accordance with a fourth aspect of the present invention, the bicycle operating device according to at least one of the above aspects is configured so that the reservoir bore is arranged without overlapping with the cylinder bore in a lateral direction perpendicular to the longitudinal direction in the mounting state.

With the bicycle operating device according to the fourth aspect, it is possible to make the base member thinner in the lateral direction than a base member of a conventional bicycle operating device. Accordingly, a user can easily grip the base member.

In accordance with a fifth aspect of the present invention, the bicycle operating device according to at least one of the above aspects is configured so that the cylinder bore comprises a cylinder center axis, a first cylinder end, and a second cylinder end. The second cylinder end is opposite to the first cylinder end along the cylinder center axis. The first cylinder end is farther from the proximal end portion of the base member than the second cylinder end. The reservoir bore comprises a reservoir bottom opposite to the lid opening in the longitudinal direction. The lid opening is farther from the proximal end portion of the base member than the reservoir bottom and offset from the first cylinder end.

With the bicycle operating device according to the fifth aspect, the lid opening is offset from the first cylinder end. Accordingly, it enhances design flexibility of the bicycle operating device compared to a bicycle operating device in which the lid opening and the first cylinder end are disposed in parallel, and it can effectively utilize an inner space of the base member.

In accordance with a sixth aspect of the present invention, the bicycle operating device according to at least one of the above aspects is configured so that the base member comprises an operating-member support portion to rotatably support the operating member. The lid opening is arranged above the operating-member support portion in the mounting state.

With the bicycle operating device according to the sixth aspect, the reservoir bore does not interfere with rotation of the operating member.

In accordance with a seventh aspect of the present invention, the bicycle operating device according to at least one of the above aspects is configured so that the lid opening has a circular shape.

With the bicycle operating device according to the seventh aspect, the reservoir bore has a cylindrical shape. Accordingly, it is easy to form the reservoir bore by molding.

In accordance with an eighth aspect of the present invention, the bicycle operating device according to at least one of the above aspects is configured so that the reservoir tank has a bleeding port connected to the reservoir bore. The bleeding port is provided between the lid opening and the reservoir bottom. The reservoir bottom is closer to the bleeding port than the lid opening.

With the bicycle operating device according to the eighth aspect, it enhances design flexibility of the bicycle operating device, and it can effectively utilize an inner space of the base member.

In accordance with a ninth aspect of the present invention, the bicycle operating device according to at least one of the above aspects further comprises a connection path connecting the reservoir bore to the cylinder bore. The connection path is aligned with the bleeding port.

With the bicycle operating device according to the ninth aspect, it is easy to discharge air intruded into the cylinder bore from the bleeding port.

In accordance with a tenth aspect of the present invention, the bicycle operating device according to at least one of the above aspects is configured so that the operating member is pivotable relative to the base member between a rest position and an operated position. The piston is movably provided in the cylinder bore to be pulled in response to a movement of the operating member from the rest position to the operated position.

With the bicycle operating device according to the tenth aspect, it is possible to arrange the cylinder bore between the operating member and the proximal end portion of the base member. Accordingly, it enhances design flexibility of the bicycle operating device, and it can effectively utilize an inner space of the base member.

In accordance with an eleventh aspect of the present invention, the bicycle operating device according to at least one of the above aspects is configured so that the cylinder bore comprises a first cylinder end and a second cylinder end opposite to the first cylinder end along the cylinder center axis. The first cylinder end is farther from the proximal end portion than the second cylinder end. The base member comprises an outlet port connected to the first cylinder end.

With the bicycle operating device according to the eleventh aspect, the cylinder bore does not interfere with rotation of the operating member. In addition, the hydraulic unit can output hydraulic fluid via the outlet port.

In accordance with a twelfth aspect of the present invention, the bicycle operating device according to at least one of the above aspects is configured so that the proximal end portion includes a mounting surface having a curved shape corresponding to a handlebar.

With the bicycle operating device according to the twelfth aspect, it is possible to firmly fix the bicycle operating device to a drop-down handlebar. In addition, the base member allows the user to easily operate the operating member.

In accordance with a thirteenth aspect of the present invention, the bicycle operating device according to at least one of the above aspects is configured so that the distal end portion includes a pommel portion.

With the bicycle operating device according to the thirteenth aspect, the pommel portion allows the user to lean on the base member during riding a bicycle.

In accordance with a fourteenth aspect of the present invention, the bicycle operating device according to at least one of the above aspects is configured so that the reservoir tank is integrally provided with the base member at least partly on the pommel portion.

With the bicycle operating device according to the fourteenth aspect, it is easy to form the reservoir tank with the base member by molding.

In accordance with a fifteenth aspect of the present invention, the bicycle operating device according to at least one of the above aspects is configured so that the cylinder bore is integrally provided with the base member.

With the bicycle operating device according to the fifteenth aspect, it is easy to form the cylinder bore with the base member by molding. In addition, in a case where both the cylinder bore and the reservoir tank is integrally provided with the base member, it is easy to form the cylinder bore and the reservoir tank with the base member by molding.

In accordance with a sixteenth aspect of the present invention, the bicycle operating device according to at least one of the above aspects is configured so that the base member is made of resin.

With the bicycle operating device according to the sixteenth aspect, it is possible to save weight of the bicycle operating device. In addition, it is easy to form the reservoir bore by molding.

In accordance with a seventeenth aspect of the present invention, the bicycle operating device according to at least one of the above aspects further comprises a grip cover at least partly covering the base member.

With the bicycle operating device according to the seventeenth aspect, it is possible to improve comfort to operate the bicycle operating device for a rider and/or to easily grip the bicycle operating device for the rider.

In accordance with an eighteenth aspect of the present invention, the bicycle operating device according to at least one of the above aspects is configured so that the grip cover is at least partly made of rubber.

With the bicycle operating device according to the eighteenth aspect, it is possible to further improve comfort to operate the bicycle operating device for a rider and/or to further easily grip the bicycle operating device for the rider. In addition, it is easy to attach the grip cover to the base member.

In accordance with a nineteenth aspect of the present invention, the bicycle operating device according to at least one of the above aspects further comprises a shifting unit provided at one of the base member and the operating member.

With the bicycle operating device according to the nineteenth aspect, it is possible for a rider to operate a gear shift of a bicycle component (e.g. a bicycle derailleur) by using the bicycle operating device. Accordingly, it improves convenience of the bicycle operating device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

First Embodiment

Figure 1:
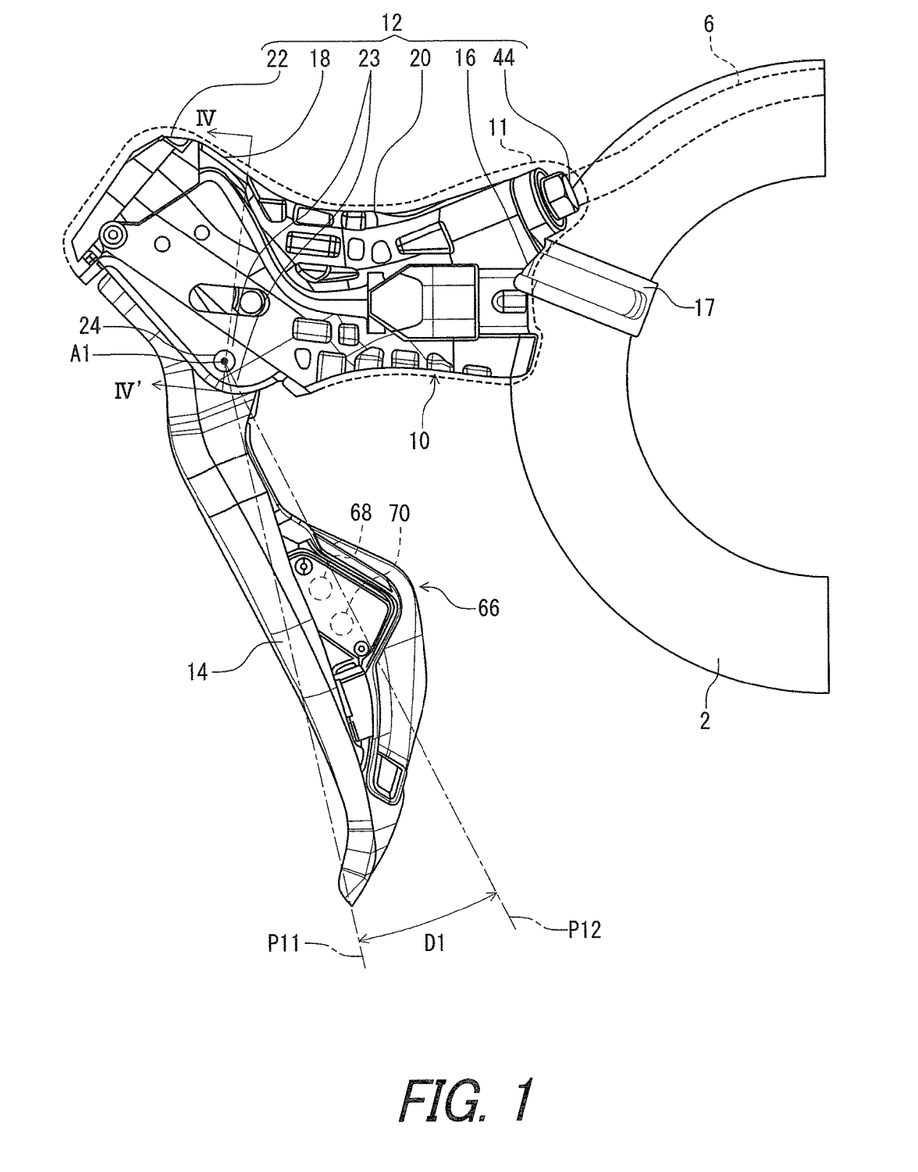
FIG. 1 is a side elevational view of a bicycle handlebar provided with a bicycle operating device in accordance with a first embodiment.

Referring initially to FIG. 1, a bicycle operating device 10 in accordance with an embodiment is mounted to a handlebar 2. In the illustrated embodiment, for example, the handlebar 2 is a drop-down bicycle handlebar. The handlebar 2 can have a shape other than the drop-down handlebar if needed and/or desired. The bicycle operating device 10 is mounted to the handlebar 2 as a right control device configured to be operated by a rider's right hand. Structures of the bicycle operating device 10 can be applied to a left control device configured to be operated by a rider's left hand. The bicycle operating device 10 can be mounted to a bicycle handlebar other than the drop-down bicycle handlebar if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing the handlebar 2. Accordingly, these terms, as utilized to describe the bicycle operating device 10, should be interpreted relative to the bicycle equipped with the bicycle operating device 10 as used in an upright riding position on a horizontal surface.

Figure 2:
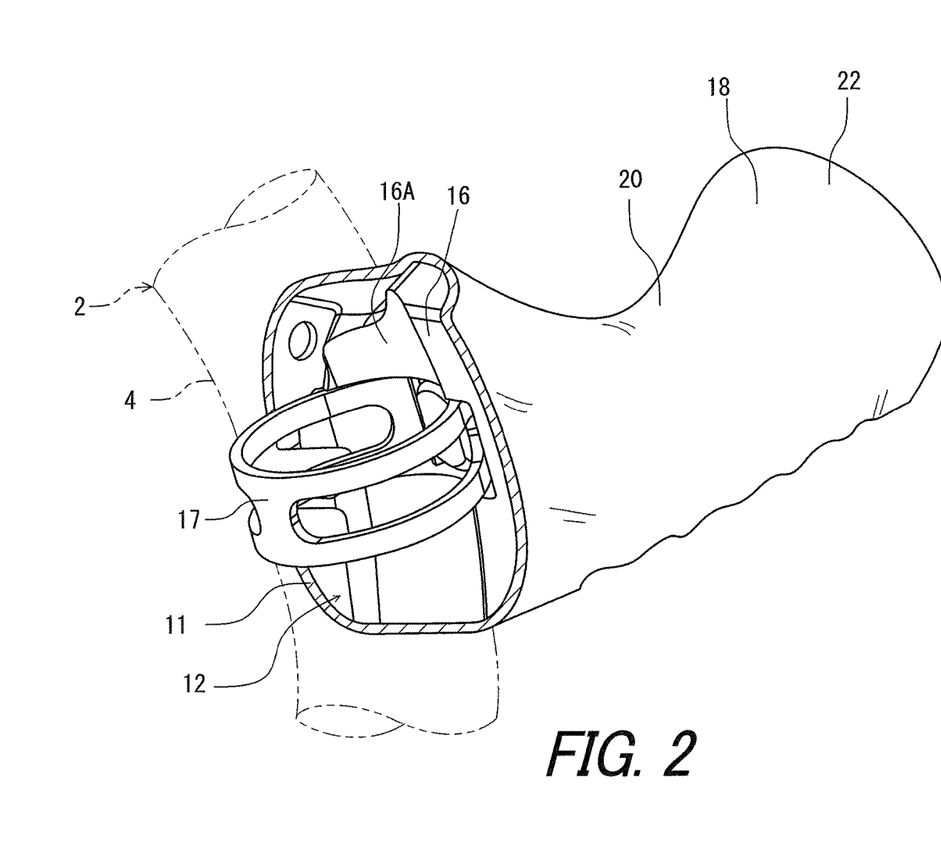
FIG. 2 is a partial perspective view of the bicycle operating device illustrated in FIG. 1.

As seen in FIG. 1, the bicycle operating device 10 comprises a base member 12 and an operating member 14. The bicycle operating device 10 further comprises a grip cover 11 at least partly covering the base member 12. However, the grip cover 11 may be omitted. The grip cover 11 is made of an elastic material. In this embodiment, the grip cover 11 is at least partly made of rubber. The base member 12 is made of resin. The base member 12 comprises a proximal end portion 16. The proximal end portion 16 is configured to be coupled to a bicycle body (e.g. the handlebar 2) in a mounting state where the bicycle operating device 10 is mounted to the bicycle body. In addition, the base member 12 comprises a distal end portion 18 arranged further from the bicycle body (e.g. the handlebar 2) than the proximal end portion 16 in the mounting state. That is, the distal end portion 18 is opposite to the proximal end portion 16. As seen in FIG. 2, the handlebar 2 includes a curved part 4. The proximal end portion 16 is configured to be coupled to the curved part 4 in the mounting state of the bicycle operating device 10. The bicycle operating device 10 comprises a mounting ring 17 to clamp the handlebar 2 between the base member 12 and the mounting ring 17. As seen in FIG. 2, the proximal end portion 16 includes a mounting surface 16A having a curved shape corresponding to the handlebar 2. Specifically, the mounting surface 16A has the curved shape corresponding to an outer peripheral surface of the curved part 4 of the handlebar 2.

As seen in FIG. 1, the base member 12 comprises a grip portion 20 arranged between the proximal end portion 16 and the distal end portion 18. The grip portion 20 is configured to be gripped by a user. That is, the base member 12 has a graspable shape between a proximal end portion 16 and a distal end portion 18. The distal end portion 18 includes a pommel portion 22. The pommel portion 22 extends obliquely upward from the grip portion 20. The pommel portion 22 is disposed at a position higher than a position of the proximal end portion 16 in the mounting state of the bicycle operating device 10.

Figure 4:
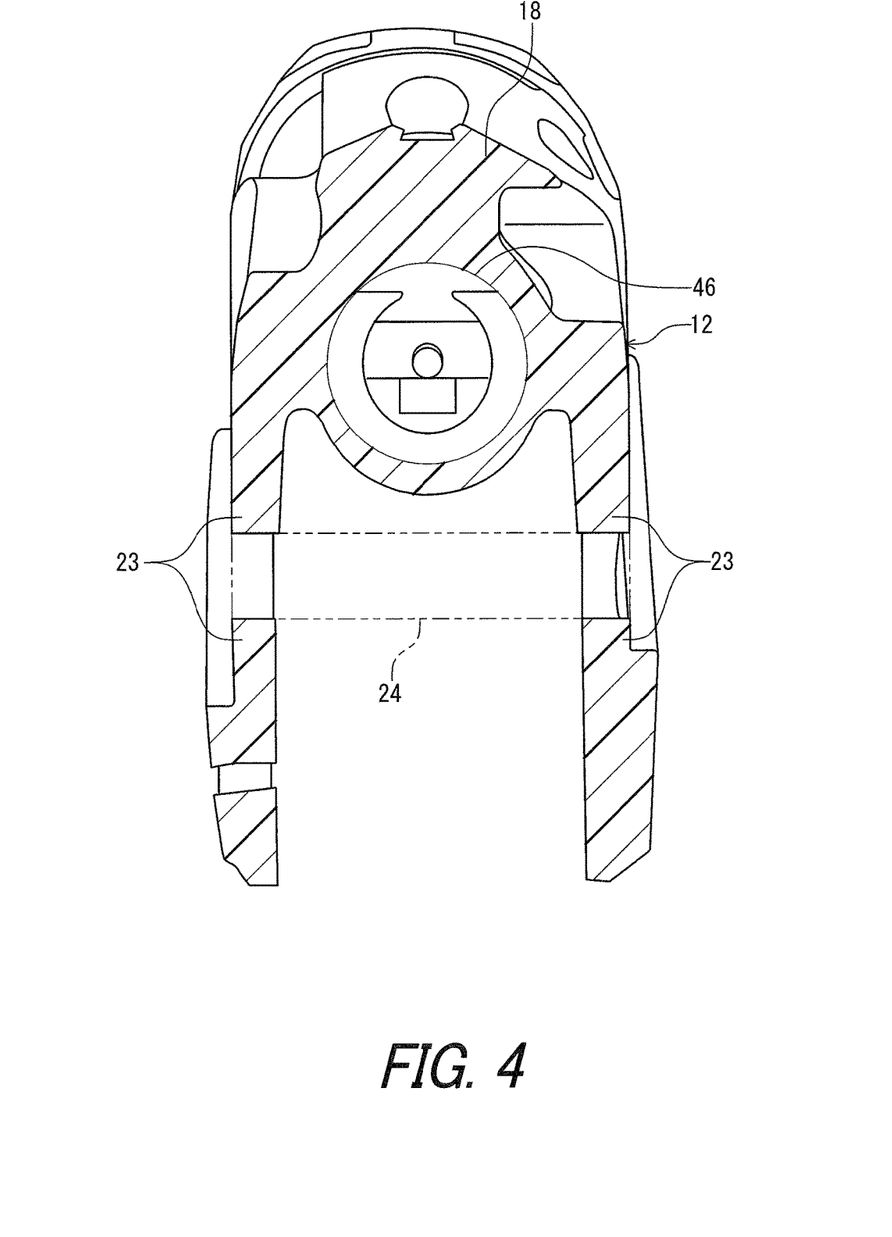
FIG. 4 is a cross-sectional view of the bicycle operating device taken along line IV-IV' of FIG. 1.

In this embodiment, the operating member 14 is a brake operating member, for example. As seen in FIGS. 1 and 4, the base member 12 further comprises an operating-member support portion 23 to rotatably support the operating member 14. That is, the operating member 14 is movably coupled to the base member 12. The operating-member support portion 23 is arranged below pommel portion 22 in the mounting state of the bicycle operating device 10. The operating-member support portion 23 supports a first pivot pin 24 connected to the operating member 14. That is, the operating member 14 is pivotally coupled to the operating-member support portion 23 via the first pivot pin 24. In this embodiment, the operating member 14 downwardly extends from the base member 12 in the mounting state of the bicycle operating device 10. The first pivot pin 24 defines a pivot axis A1. The operating member 14 is pivotable relative to the operating-member support portion 23 about the pivot axis A1 in a first direction D1. The operating member 14 is pivotable relative to the base member 12 between a rest position P11 and an operated position P12. In this embodiment, the first direction D1 is a circumferential direction defined about the pivot axis A1.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of the bicycle component.

The operating member 14 is biased by a first biasing member 27 toward the rest position P11 relative to the base member 12. Thus, the operating member 14 is at the rest position P11 in a state where the operating member 14 is not operated by the user.

Figure 3:
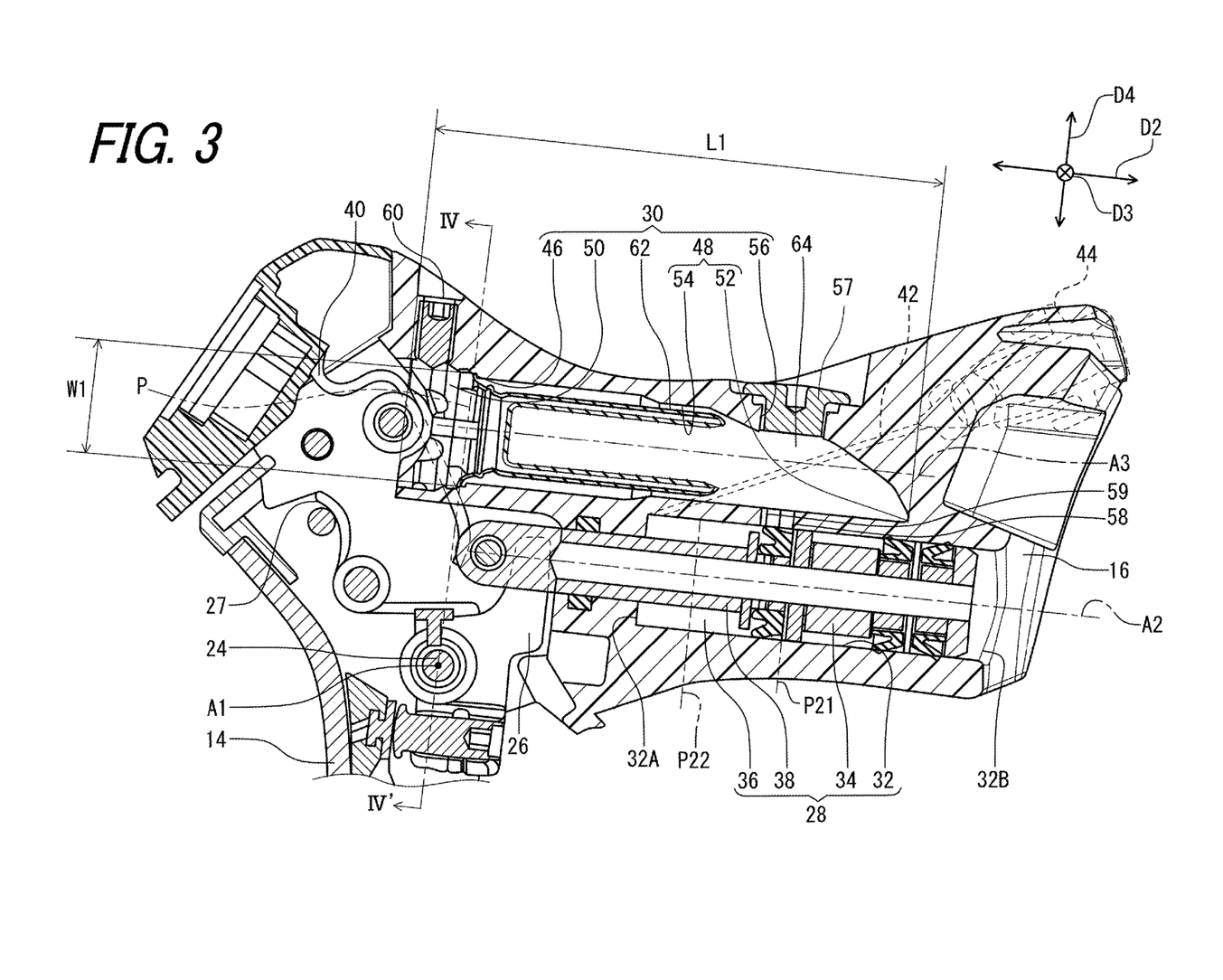
FIG. 3 is a partial cross-sectional view of the bicycle operating device illustrated in FIG. 1.

As seen in FIG. 3, the bicycle operating device 10 comprises a hydraulic unit 28 and a reservoir tank 30. The hydraulic unit 28 comprises a cylinder bore 32 and a piston 34 provided in the cylinder bore 32. The cylinder bore 32 and the piston 34 define a hydraulic chamber 36. The cylinder bore 32 typically has a cylindrical shape. However, the cylinder bore 32 may have a different shape from a cylindrical shape. The cylinder bore 32 comprises a cylinder center axis A2, a first cylinder end 32A, and a second cylinder end 32B opposite to the first cylinder end 32A along the cylinder center axis A2. The first cylinder end 32A is farther from the proximal end portion 16 of the base member 12 than the second cylinder end 32B. The first cylinder end 32A is arranged closer to the operating member 14 than the second cylinder end 32B.

The hydraulic unit 28 further comprises a piston rod 38 connected to the piston 34. The bicycle operating device 10 further comprises a coupling member 26 coupled to the operating member 14 so as to pivot in a first direction D1 together with the operating member 14. The piston rod 38 is coupled to the coupling member 26 such that the coupling member 26 is configured to be pivotable relative to the base member 12 about the pivot axis A1 to operate the hydraulic unit 28. Accordingly, the piston 34 is coupled to the operating member 14 to generate a hydraulic pressure in response to a movement of the operating member 14 relative to the base member 12. The piston 34 is positioned at the initial position P21 in a state where the operating member 14 is positioned at the rest position P11. The piston 34 is positioned at an actuated position P22 in a state where the operating member 14 is positioned at the operated position P12. That is, the piston 34 is movably provided in the cylinder bore 32 to be pulled in response to a movement of the operating member 14 from the rest position P11 to the operated position P12. However, the hydraulic unit can be constructed such that the piston is movably provided in the cylinder bore to be pushed in response to a movement of the operating member from the rest position to the operated position. The bicycle operating device 10 further comprises a second biasing member to bias the piston 34 toward the initial position P21.

The base member 12 further comprises a fluid passage 42 and an outlet port 44. The fluid passage 42 is connected to the hydraulic chamber 36 at the first cylinder end 32A. The outlet port 44 connects the fluid passage 42 and hydraulic hose 6 connected to a bicycle component (not shown, for example a bicycle brake). That is, the base member 12 comprises the outlet port 44 connected to the first cylinder end 32A. The hydraulic chamber 36 communicates with the hydraulic hose 6 via the fluid passage 42 and the outlet port 44.

The reservoir tank 30 comprises a lid opening 46 and a reservoir bore 48. The reservoir tank 30 further comprises a lid 50 attached to the lid opening 46. The lid opening 46 is arranged above the operating-member support portion 23 in the mounting state. The lid opening 46 is defined on a predetermined plane P. As seen in FIG. 4, the lid opening 46 has a circular shape. Specifically, the lid opening 46 has a circular shape as viewed in a longitudinal direction D2 perpendicular to the predetermined plane P. The longitudinal direction D2 may not be strictly perpendicular to the predetermined plane P. The longitudinal direction D2 may be substantially perpendicular to the predetermined plane P. However, the lid opening 46 may have a different shape (e.g. an elliptical shape or a polygonal shape) from a circular shape as viewed in the longitudinal direction D2. The lid opening 46 has a maximum width W1. Specifically, the lid opening 46 has a maximum width W1 as viewed in the longitudinal direction D2. In a case where the lid opening 46 has a circular shape, the maximum width W1 means a diameter of the circular shape. In a case where the lid opening 46 has an elliptical shape, the maximum width W1 means a length of a major axis of the elliptical shape. In a case where the lid opening 46 has a polygonal shape, the maximum width W1 means a maximum length of diagonal lines of the polygonal shape.

The reservoir bore 48 extends from the lid opening 46. The reservoir bore 48 extends in the longitudinal direction D2 perpendicular to the predetermined plane P. The reservoir bore 48 comprises a reservoir bottom 52 opposite to the lid opening 46. Specifically, the reservoir bore 48 comprises the reservoir bottom 52 opposite to the lid opening 46 in the longitudinal direction D2. The lid opening 46 is farther from the proximal end portion 16 of the base member 12 than the reservoir bottom 52 and offset from the first cylinder end 32A. Specifically, the lid opening 46 is farther from the proximal end portion 16 of the base member 12 than the first cylinder end 32A. The reservoir bore 48 has a maximum depth L1. The maximum depth L1 is larger than the maximum width W1.

The reservoir bore 48 has a main part 54 between the lid opening 46 and the reservoir bottom 52 in the longitudinal direction D2. The reservoir bore 48 has a bleeding port 56 on the main part 54. That is, the reservoir tank 30 has a bleeding port 56 connected to the reservoir bore 48. The bleeding port 56 is provided between the lid opening 46 and the reservoir bottom 52. The reservoir bottom 52 is closer to the bleeding port 56 than the lid opening 46. The bicycle operating device 10 further comprises a bleeding cap 57 detachably attached to the bleeding port 56 with a thread connection.

As seen in FIG. 3, the reservoir bore 48 is arranged without overlapping with the cylinder bore 32 in a lateral direction D3 perpendicular to the longitudinal direction D2 in the mounting state. Specifically, the reservoir bore 48 is disposed above the cylinder bore 32 in the mounting state. The lateral direction D3 may not be strictly perpendicular to the longitudinal direction D2. The lateral direction D3 may be substantially perpendicular to the longitudinal direction D2. At least one of the cylinder bore 32 and the reservoir tank 30 is integrally provided with the base member 12 as a one-piece unitary member with respect to the base member 12. In the illustrated embodiment, all of the cylinder bore 32, and the lid opening 46 and the reservoir bore 48 of the reservoir tank 30 are integrally provided with the base member 12 as a one-piece unitary member with respect to the base member 12. Further, the lid opening 46 and the reservoir bore 48 of the reservoir tank 30 are integrally provided with the base member 12 at least partly on the pommel portion 22. However, one of the cylinder bore 32 and the reservoir tank 30 may be a separate member from the base member 12.

The reservoir bore 48 is connected to the cylinder bore 32. Specifically, the bicycle operating device 10 further comprises a connection path 58 or 59 connecting the reservoir bore 48 to the cylinder bore 32. More specifically, the bicycle operating device 10 further comprises a first connection path 58 and a second connection path 59 connecting the reservoir bore 48 to the cylinder bore 32. The connection path 58 or 59 is aligned with the bleeding port 56. More specifically, the first connection path 58 and the second connection path 59 is aligned with the bleeding port 56. One of the first connection path 58 and the second connection path 59 may be omitted.

As seen in FIG. 3, the lid 50 is attached to the reservoir bore 48 to cover the lid opening 46 using a locking screw 60. The locking screw 60 is screwed into the base member 12 in an up-down direction D4 substantially perpendicular to the longitudinal direction D2 and the lateral direction D3 to lock the lid 50. The reservoir tank 30 further comprises a diaphragm 62. The diaphragm 62 is provided to be deformable in the reservoir bore 48. The reservoir bore 48 and the lid 50, and the diaphragm 62 define a reservoir chamber 64. The reservoir chamber 64 is configured to be filled with hydraulic fluid and is connected to the hydraulic chamber 36 via the first connection path 58 and the second connection path 59. The diaphragm 62 is configured to change an interior volume of the reservoir chamber 64 in response to the hydraulic pressure of the hydraulic chamber 36.

As seen in FIG. 1, the bicycle operating device 10 further comprises a shifting unit 66. The shifting unit 66 comprises electrical switches 68 and 70 to receive an input operation. The electrical switch 68 is provided at the operating member 14. The electrical switch 70 is provided at the operating member 14. The electrical switch 68 receives an upshift input operation from the user. The electrical switch 70 receives a downshift input operation from the user. The shifting unit 66 is configured to be connected with a bicycle component (e.g. a bicycle derailleur) via a wired connection, a wireless connection or their combination. Alternatively or additionally, the shifting unit 66 may be configured to pull and release an inner wire of a Bowden type cable that can be applied to the bicycle operating device 10 if needed and/or desired.

Second Embodiment

Figure 5:
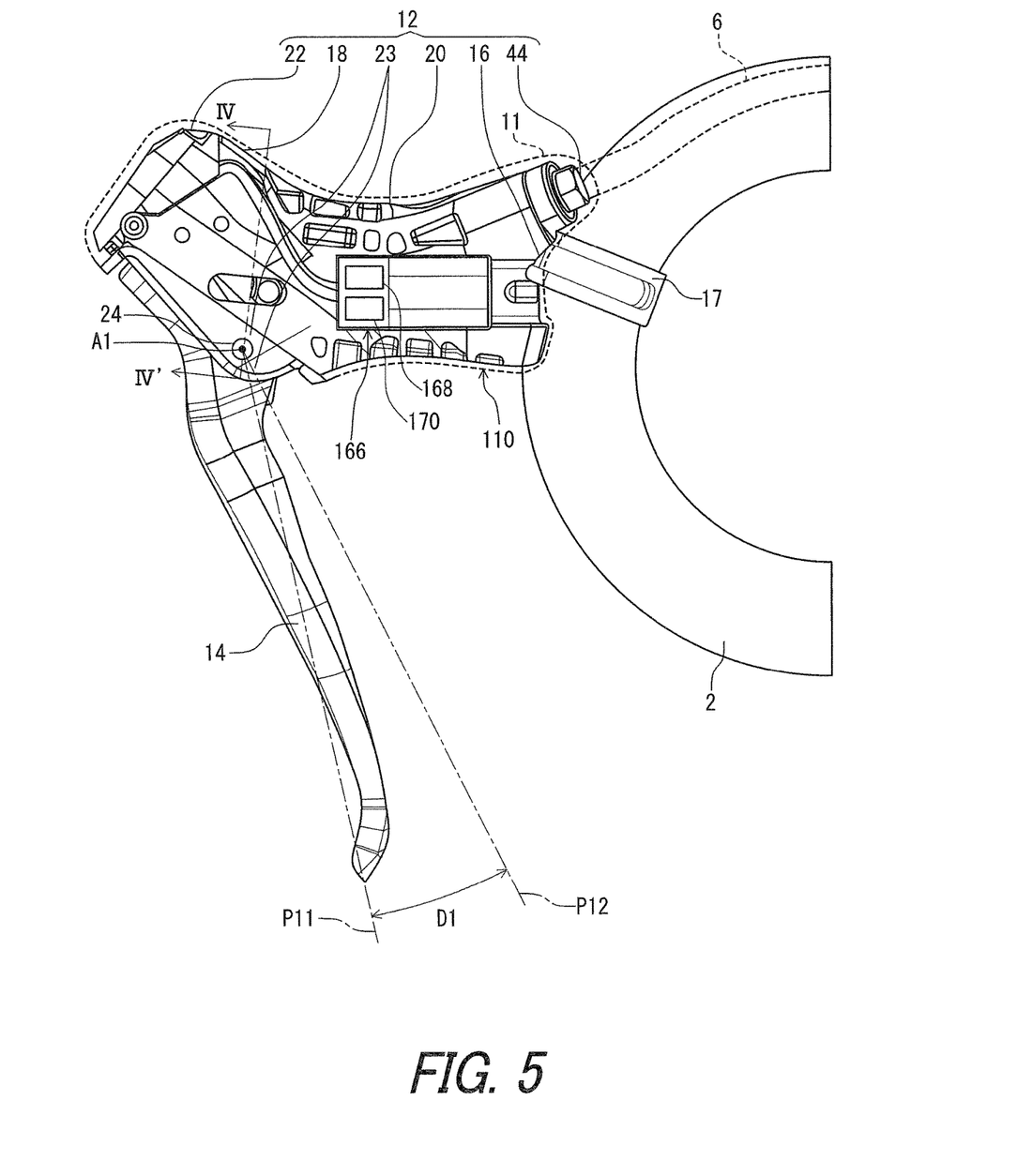
FIG. 5 is a side elevational view of a bicycle operating device in accordance with a second embodiment.

A bicycle operating device 110 in accordance with a second embodiment will be described below referring to FIG. 5. The bicycle operating device 110 has the same structures and/or configurations as those of the bicycle operating device 10 except for the shifting unit. Thus, elements having substantially the same function as those in the first embodiment will be numbered the same here, and will not be described and/or illustrated again in detail here for the sake of brevity. As seen in FIG. 5, the bicycle operating device 110 further comprises a shifting unit 166 provided at the base member 12. The shifting unit 166 comprises electrical switches 168 and 170. The electric switches 168 and 170 have substantially the same configurations as those of the electrical switches 68 and 70. In the illustrated embodiment, however, the electrical switches 168 and 170 are provided at the base member 12.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
 a base member comprising:
  a proximal end portion configured to be coupled to a bicycle body in a mounting state where the bicycle operating device is mounted to the bicycle body; and
  a distal end portion arranged further from the bicycle body than the proximal end portion in the mounting state, the base member having a graspable shape between the proximal end portion and the distal end portion;
 an operating member movably coupled to the base member, the operating member being pivotable relative to the base member about a pivot axis;
 a hydraulic unit comprising:
  a cylinder bore provided between the pivot axis and the proximal end portion; and
  a piston movably provided in the cylinder bore, the piston being coupled to the operating member to generate a hydraulic pressure in response to a movement of the operating member relative to the base member; and
 a reservoir tank comprising:
  a lid opening having a maximum width; and
  a reservoir bore extending from the lid opening and having a maximum depth, the maximum depth being larger than the maximum width, the reservoir bore being connected to the cylinder bore and disposed above the cylinder bore in the mounting state, at least one of the cylinder bore and the reservoir tank being integrally provided with the base member.

2. The bicycle operating device according to claim 1, wherein
 the lid opening is defined on a predetermined plane, and
 the reservoir bore extends in a longitudinal direction perpendicular to the predetermined plane.

3. The bicycle operating device according to claim 2, wherein
 the reservoir bore is arranged without overlapping with the cylinder bore in a lateral direction perpendicular to the longitudinal direction in the mounting state.

4. The bicycle operating device according to claim 2, wherein
 the cylinder bore comprises:
  a cylinder center axis;
  a first cylinder end; and
  a second cylinder end opposite to the first cylinder end along the cylinder center axis, the first cylinder end being farther from the proximal end portion of the base member than the second cylinder end,
 the reservoir bore comprises a reservoir bottom opposite to the lid opening in the longitudinal direction, and
 the lid opening is farther from the proximal end portion of the base member than the reservoir bottom and offset from the first cylinder end.

5. The bicycle operating device according to claim 1, wherein
 the base member comprises an operating-member support portion to rotatably support the operating member, and
 the lid opening is arranged above the operating-member support portion in the mounting state.

6. The bicycle operating device according to claim 2, wherein
 the lid opening has a circular shape.

7. The bicycle operating device according to claim 4, wherein
 the reservoir tank has a bleeding port connected to the reservoir bore, the bleeding port being provided between the lid opening and the reservoir bottom, and the reservoir bottom is closer to the bleeding port than the lid opening.

8. The bicycle operating device according to claim 7, further comprising:
a connection path connecting the reservoir bore to the cylinder bore, the connection path being aligned with the bleeding port.

9. The bicycle operating device according to claim 1, wherein
the operating member is pivotable relative to the base member between a rest position and an operated position, and
the piston is movably provided in the cylinder bore to be pulled in response to a movement of the operating member from the rest position to the operated position.

10. The bicycle operating device according to claim 9, wherein
the cylinder bore comprises a first cylinder end and a second cylinder end opposite to the first cylinder end along the cylinder center axis, the first cylinder end being farther from the proximal end portion than the second cylinder end, and
the base member comprises an outlet port connected to the first cylinder end.

11. The bicycle operating device according to claim 1, wherein
the proximal end portion includes a mounting surface having a curved shape corresponding to a handlebar.

12. The bicycle operating device according to claim 1, wherein
the distal end portion includes a pommel portion.

13. The bicycle operating device according to claim 12, wherein
the reservoir tank is integrally provided with the base member at least partly on the pommel portion.

14. The bicycle operating device according to claim 13, wherein
the cylinder bore is integrally provided with the base member.

15. The bicycle operating device according to claim 1, wherein
the base member is made of resin.

16. The bicycle operating device according to claim 1, further comprising:
a grip cover at least partly covering the base member.

17. The bicycle operating device according to claim 16, wherein
the grip cover is at least partly made of rubber.

18. The bicycle operating device according to claim 1, further comprising:
a shifting unit provided at one of the base member and the operating member.

19. The bicycle operating device according to claim 4, wherein
the reservoir bottom end is provided between the pivot axis and the proximal end portion of the base member.

20. The bicycle operating device according to claim 7, wherein
the bleeding port is provided between the pivot axis and the proximal end portion of the base member.

21. The bicycle operating device according to claim 12, wherein
the base member comprises a grip portion between the proximal end portion and the distal end portion, and
the cylinder bore is provided in the grip portion.

22. The bicycle operating device according to claim 1, wherein
the base member has an opening at the proximal end portion, the opening communicating with the cylinder bore.

23. A bicycle operating device comprising:
a base member comprising a proximal end portion;
an operating member movably coupled to the base member, the operating member being pivotable relative to the base member about a pivot axis;
a hydraulic unit comprising:
a cylinder bore comprising:
a cylinder center axis;
a first cylinder end; and
a second cylinder end opposite to the first cylinder end along the cylinder center axis, the first cylinder end being farther from the proximal end portion than the second cylinder end, the second cylinder end being provided between the pivot axis and the proximal end portion; and
a piston movable provided in the cylinder bore, the piston being coupled to the operating member to generate a hydraulic pressure in response to a movement of the operating member relative to the base member; and
a reservoir tank comprising:
a lid opening having a maximum width; and
a reservoir bore extending from the lid opening and having a maximum depth, the maximum depth being larger than the maximum width, the reservoir bore being connected to the cylinder bore and disposed above the cylinder bore in a mounting state where the bicycle operating device is mounted to a bicycle body,
the reservoir bore comprising:
a reservoir bottom opposite to the lid opening, the lid opening being farther from the proximal end portion of the base member than the reservoir bottom and offset from the first cylinder end.

24. The bicycle operating device according to claim 23, wherein
the base member has an opening at the proximal end portion, the opening communicating with the cylinder bore.

* * * * *